(12) United States Patent
de Groot

(10) Patent No.: US 6,421,047 B1
(45) Date of Patent: *Jul. 16, 2002

(54) MULTI-USER VIRTUAL REALITY SYSTEM FOR SIMULATING A THREE-DIMENSIONAL ENVIRONMENT

(76) Inventor: Marc de Groot, 4487 23rd St., #2, San Francisco, CA (US) 94114

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 08/926,508

(22) Filed: Sep. 9, 1997

Related U.S. Application Data

(60) Provisional application No. 60/025,684, filed on Sep. 9, 1996.

(51) Int. Cl.[7] .......................... G06T 15/00; G06T 15/70
(52) U.S. Cl. ....................................... 345/419; 345/473
(58) Field of Search ................................ 345/473, 331, 345/522, 352; 707/8, 9, 10

(56) References Cited

U.S. PATENT DOCUMENTS

| | | | | |
|---|---|---|---|---|
| 4,988,981 A | | 1/1991 | Zimmerman et al. | 340/709 |
| 5,724,575 A | * | 3/1998 | Hoover et al. | 395/610 |
| 5,821,925 A | * | 10/1998 | Carey et al. | 345/331 |
| 5,850,352 A | * | 12/1998 | Moezzi et al. | 364/514 A |
| 5,872,924 A | * | 2/1999 | Nakayama | 395/200.35 |
| 5,889,951 A | * | 3/1999 | Lombardi | 395/200.49 |

OTHER PUBLICATIONS

Park et al., "Object–oriented VRML for multi–user environments", ACM, pp. 25–32, 1997*

Meyer et al., WAXweb: Toward dynamic MOO–based VRML, ACM, pp. 103–108, 1995.*

Vermulapati et al., "Incremental loading in the persistent C++ language E", MIT, pp. 34–42, 1995.*

Broll, "Populating the internet: supporting multiple users and shared applications with VRML", ACM, pp. 33–40, 1997.*

Keedy et al, "Persistent protected modules and persistent processes as the basis for a more secure operating system", System Sciences, pp. 747–756, 1997.*

Gigante et al., Distributed, Multi–Person, Physically–Based Interaction in Virtual Worlds, Communication with Virtual Worlds, pp. 41–49, 1993.*

Pimentel et al., Virtual Reality through the new looking glass, pp. 64–103, 1992.*

Fig– Forth, "Installation Manual Glossary Model", May 1979.

* cited by examiner

Primary Examiner—Jeffery Brier
Assistant Examiner—Mohlewa Good-Johnson
(74) Attorney, Agent, or Firm—Haverstock & Owens LLP

(57) ABSTRACT

A computer-implemented multi-user virtual reality system that erects a networked virtual world for real time interaction amongst multiple participants. A computer-simulation of an animated world is network-distributed amongst participants, e.g., as a virtual world. The simulation accommodates multiple users whose computers are connected by a communications network. The users' computers need not be the same type of machine. Users can interact with one another and with the objects in the virtual world. The properties of objects in the virtual world, such as form, color, and behavior, are displayed on monitors and can be modified in real time while the simulation is running. Modifications to objects are stored and therefore persist, and can therefore bridge across computer system shutdowns and restarts.

27 Claims, 3 Drawing Sheets

MULTI-USER VIRTUAL REALITY SYSTEM FOR SIMULATING A THREE-DIMENSIONAL ENVIRONMENT

RELATED APPLICATION

This application is a continuation under 37 C.F.R. 1.60 of a United States patent application filed by Marc de Groot in the United States Patent and trademark Office on Sep. 9, 1996, Ser. No. 60/025,684, and titled, MULTI-USER VIRTUAL-REALITY SYSTEM FOR SIMULATING A THREE-DIMENSIONAL ENVIRONMENT, and is incorporated in full herein by reference.

COPYRIGHT NOTICE

A portion of the disclosure of this patent document contains material which is subject to copyright protection. In particular, the several appendices are copyright 1993–1996 by Marc de Groot and Immersive Systems, Inc. The copyright owners have no objection to the facsimile reproduction by anyone of the patent document or the patent disclosure, as it appears in the Patent and Trademark Office patent file or records, but they otherwise reserve all copyright rights whatsoever. (See, 37 C.F. R. §1.71 (d)–(e).)

BACKGROUND OF THE INVENTION

The invention relates generally to computer-implemented methods and systems for network communication and participation and more specifically, to systems and methods for building, representing and interactively animating the interplay of imaginary objects in a simulated three-dimensional world.

SUMMARY OF THE PRESENT INVENTION

A computer-implemented multi-user virtual reality system that erects a networked virtual world for real time interaction amongst multiple participants. A computer-simulation of an animated world is network-distributed amongst participants, e.g., as a virtual world. The simulation accommodates multiple users whose computers are connected by a communications network. The users' computers need not be the same type of machine. Users can interact with one another and with the objects in the virtual world. The properties of objects in the virtual world, such as form, color, and behavior, are displayed on monitors and can be modified in real time while the simulation is running. Modifications to objects are stored and therefore persist, and can therefore bridge across computer system shutdowns and restarts.

IN THE DRAWINGS

DETAILED DESCRIPTION OF THE PREFERRED EMBODIMENT

Figure 1:
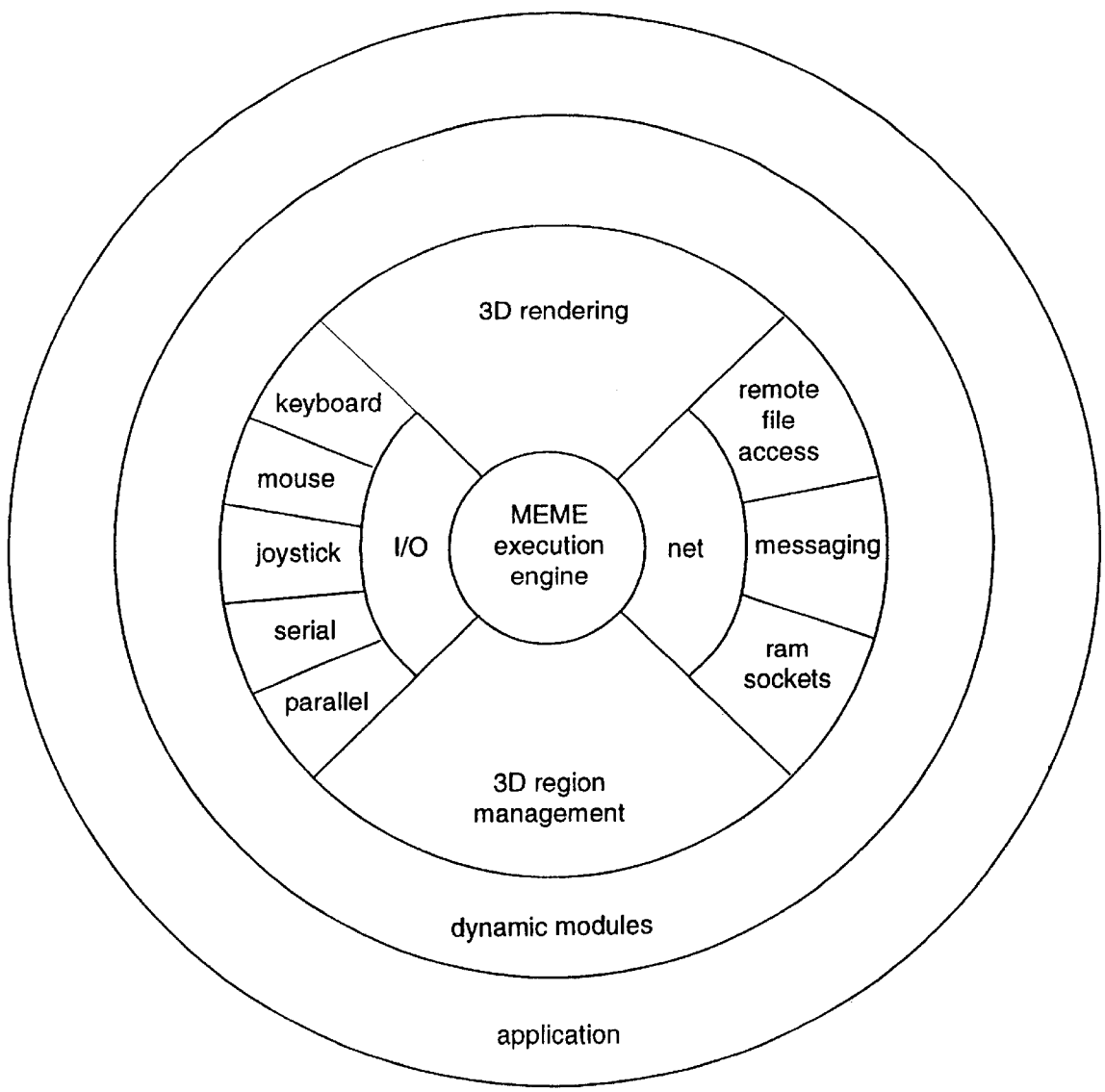
FIG. 1 is an onion-layer diagram of a multi-user virtual reality (VR) system embodiment of the present invention.
Figure 2:
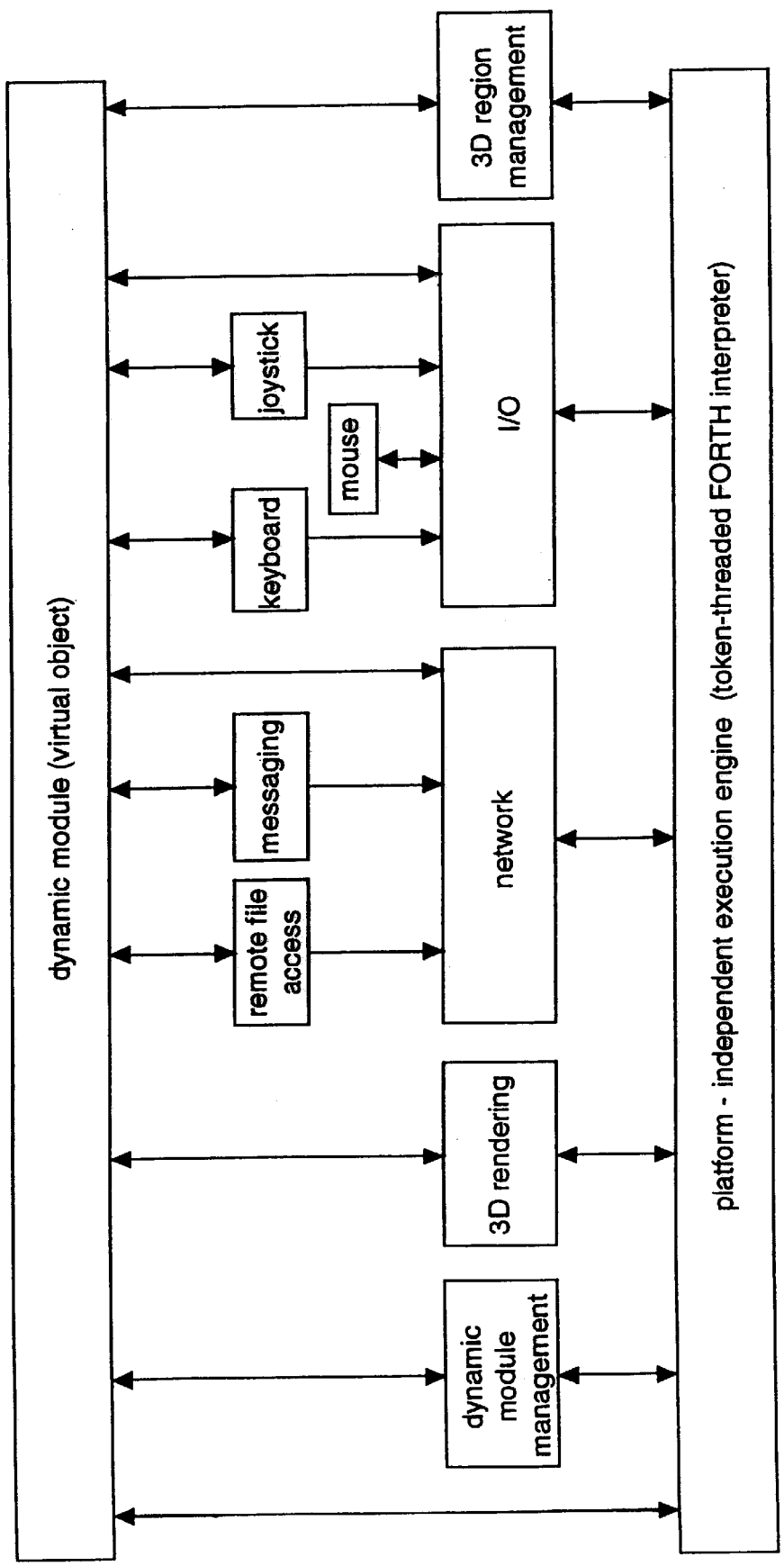
FIG. 2 is a block diagram showing parts of the multi-user virtual reality (VR) system of FIG. 1.
Figure 3:
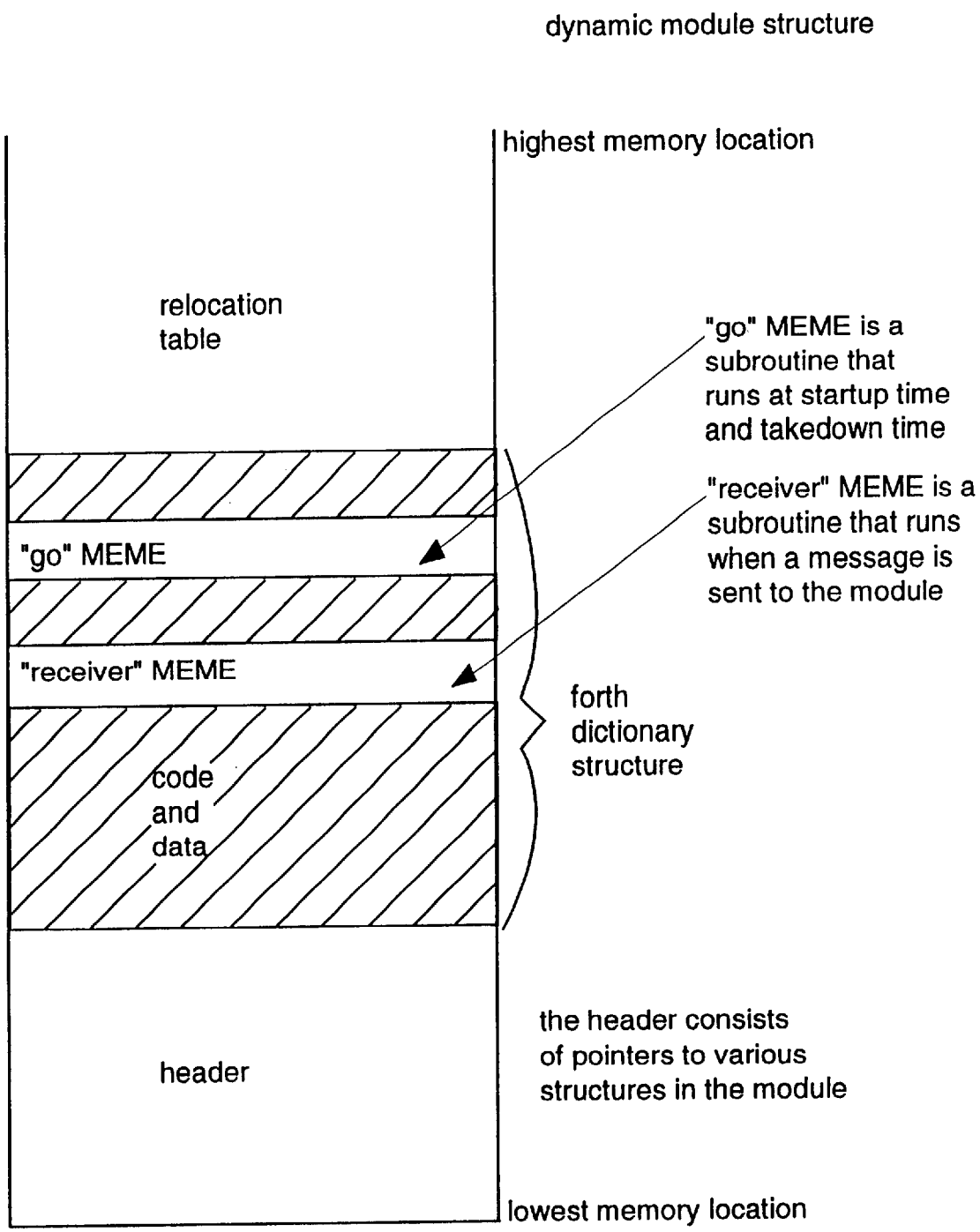
FIG. 3 is a memory map of the multi-user virtual reality (VR) system resident in a typical computer.

FIGS. 1–3 variously illustrate a multi-user virtual reality (VR) system 10 which is preferably implemented as a computer-implemented method that creates networked virtual world for real time interaction amongst multiple participants. A computer simulation is established and distributed across a computer network to participants and is pictorialized and animated as a virtual world. The simulation accommodates multiple users whose computers are preferably connected by a communications network, e.g., TCP/IP, the "internet", etc. The respective physical types of each user's computers need not be the same type of machine. Users can interact with one another and with the objects in the virtual world. Any property of an object, including its form, color, and behavior, can be modified in real time while the simulation is running. Modifications to objects persist, even in the event of a computer system shutdown and restart.

A host computer is one of a plurality of computers physically distributed but connected by a communications network. Each host computer is identified on the network by a unique symbol, e.g., a host ID numeric code that is preferably a 32-bit data word. The network IP number for the host can be used for the host ID.

The local host has a variety of input/output (I/O) devices with which a given human user directly interacts to experience and impact the virtual world. A local user directly interacts with a given host's I/O devices.

A dynamic module is preferably a block of binary executable code and/or data. Each such module has a predefined and standardized structure and is critically hardware-platform independent. Such modules comprise relocation information that permits values within the module to be adjusted according to the address at which it is loaded. A program entry point is included in each module for initializing and de-initializing the contents. Another program entry point is provided for the receiving and processing of messages transmitted by other modules. Each dynamic module typically represents one virtual object.

Each dynamic module has a module ID symbol that uniquely identifies it among all the other modules loaded on its host. In one embodiment, the module ID is 32-bits wide, and is the base address of the module in its host's memory.

A master module is used as the central hub for communications for the copies of a virtual object in a shared space. The master module acts as an arbiter of conflicting requests, disseminates messages to the slave copies about changes, and makes the final decision about whether to allow a modification of the virtual object. The master module runs on the host that owns the virtual object.

A slave module processes messages from the master module about changes in its appearance or other properties. The slave keeps the master informed about interactions it has with other virtual objects. The slave module cannot change its properties in direct response to an interaction. It communicates the interaction to the master and waits to be instructed to modify itself.

A quantity "hmID' is used to uniquely identify a module among all modules in the virtual universe. The hmID is preferably a two-dimensional quantity comprised of the module ID of the module and the host ID of the host on which it is loaded.

A prism is preferably a rectangular prism, e.g., a three-dimensional solid with six sides, eight vertices and twelve edges. Every pair of edges that meet at a vertex form a right angle, e.g., a box. The prism's faces are always parallel with one of the XY, XZ, or YZ plane of the universe coordinate system. The prism is defined by giving the interval over which the prism extends when projected onto each of the X, Y and Z axes of the universe coordinate system. The notation for a prism is ($X_{min}$, $X_{max}$, $Y_{min}$, $Y_{max}$, $Z_{min}$, $Z_{max}$). A point p=(x, y, z) is considered to lie inside the prism of $X_{min}$<=$P_x$<$X_{max}$ and $Y_{min}$<=Py<$Y_{max}$ and $Z_{min}$<=Pz<$Z_{max}$.

A region is preferably a set of one or more prisms and regions that are contiguous.

Modules are intended to hold any sort of virtual object that can be imagined by the designer, and the specification of module functionality is open-ended. However, multi-user VR system 10 specifies some required types of modules, and specifies their behavior, to provide a framework for the virtual universe.

A deck module is the first module that runs when the system is started up, and such are responsible for reading a stored configuration and starting the other modules in the system. The deck module also acts as an initial point of contact for communications from other hosts, and provides a global repository service for data shared by many modules on a given host. The deck module has no master/slave counterparts.

A space module is used to create and manage the objects and properties in the immediate environment around a user. The immediate environment is typically the contents of one room or building. A space master module is one that creates the objects in the space that is owned by the local host. By running the module, the local host acts as a server for the space it owns. This module is not loaded if the local host owns no space. A space slave module is one that creates the objects in the space that the self experiences. The space slave module is not loaded unless there is a self master module running. Its function is to provide sensory input for the local user. If the self master module is running, there is preferably always a space slave module running. It is preferably always a slave copy of the space that the local user is in.

A view module drives the three-dimensional display of the space, and runs the task that draws the world on the monitor or in the HMD. The view module creates the camera object and the rendering task. The view module has no master/slave counterparts.

A self module implements the user's presence in the virtual universe and creates the vehicle module, the instrument panel module, and the avatar module. A self master module always runs on the user's local host. It processes input from the user via the local host's I/O devices, and sends messages to the self slave module(s) to update the avatar visible object and the instrument panel in accordance with the user's actions. A self slave module creates and manages the visible manifestation of a user, and runs on every host that is running a copy of the space that Alice, the local user, is in. For example, if Alice is the only user in the space, there is only one copy of Alice's self slave module running, and it runs on the host that owns the space. If there are other users in the space, there is one additional copy of Alice's self slave module running on each user's local host.

A vehicle module provides the "feet" for a self module, and provides the user with the ability to move around in the virtual world. A vehicle master module holds a task that takes input from the user, e.g., via the mouse, keyboard, or some other I/O device. It translates that input into commands to move. A vehicle slave module receives motion updates from the vehicle master and applies them to the self slave module. When the vehicle slave is started, it is sent a message with a pointer to the object whose position it should control. The slave responds directly to this message, because it is the slave self module that sends it.

An instrument-panel module implements the "hands" of the self module. It gives the user the ability to manipulate the objects in the virtual world. The instrument-panel module manifests as a visible object that is preferably attached to the eyepoint, and hence does not change position with respect to the viewing frustum of the camera object. The visible object is preferably an icon for a tool. The tool, when selected with a pointing device, e.g., a mouse or glove, and changes its visual properties so as to bring into view other, similar icons that represent tools for manipulating virtual objects. The icons at every level have the same behavior; they can be stacked to as many levels of depth as are practicable.

An instrument-panel master module runs a task that waits for a selection event from the pointing device. The pointing device can be used by both the vehicle module and the panel module; for this reason the panel master checks whether the selection event selected an object that is in the domain of the currently active tool. If the object is in the tool's domain, a message is sent to the vehicle causing it to suspend motion. When the selection event is finished, another message is sent to the vehicle to allow it to resume motion. An instrument-panel module slave module is used to create the visible-object tool icon. It receives messages from the panel master module to highlight and not highlight, and select and unselect the tool icon. The panel slave module changes the visual properties of the tool icon in response to these messages.

A root-tool is the first tool created by the instrument-panel module in a tool hierarchy. The root-tool can be written so it loads and unloads child tools when it is selected and unselected. A root-tool master module processes four specialized messages: highlight, not highlighted, select, and unselect. It passes such messages onto its slave counterparts so they can update the visual properties of the root-tool icon. A root-tool slave module creates and destroys the icon for the root-tool when the module is loaded and unloaded. It processes four specialized messages: highlight, not highlighted, select, and unselect. It reacts to these messages by changing a property or properties of the tool icon. The property changes are not restricted, but the color or brightness of the icon will increase when it is highlighted. So the icon will experience a visual change when selected that will be readily noticeable even after many minutes, such as a continuous animation of the icon. Any change made to the icon on highlight or selection should be reversed on not highlighted or unselection. The highlighted message is sent when the pointing device's cursor or image overlaps the icon. The not highlighted message is sent when the pointing device's "grab" state changes. In the case of a mouse, the "grab" state changes on a mouse-down or mouse-up event. For devices other than mice, the "grab" state transition is device-dependent.

An avatar is preferably a visible and audible representation of the user in the virtual world. It is the "body" of the user as s/he moves through the virtual space. An avatar master module runs a task that animates the avatar according to motion produced by the vehicle and input produced by various I/O devices such as datagloves, three-dimensional tracking devices on the hand or head, etc. An avatar slave module is used to create the visible and audible objects that represent the user in the virtual world. The avatar slave relies on the avatar master to tell it how to move and make sound.

A host can own a space. A space is preferably a completely bounded section of 3-space. Ownership of a space by a host means that the host makes the final decision about modification of any object or any property of the space.

There can be several operating modes. The deck module runs different sets of daughter modules depending on the configuration of the local host and local user. The system can be run stand-alone or connected to a network. If the network interface is disabled, the network mode is "stand-alone", otherwise it is "networked".

There is a distinction between owning and not owning a space in the host mode. If the local host owns a space, it must run a space master module. The space master module creates the master copies of all objects in the space. It clones slave copies of the objects when a user visits.

An inactive local user consumes no system resources. There is no need to drive the display, so neither the view module nor the space slave module are needed. The user is not present in the virtual universe, so the self module is not loaded.

The passive local user is preferably a spectator. The display is driven so the virtual world can be seen, but the user has no presence in the world. The user can neither move about nor affect the virtual world. The view module and space slave module are loaded, but the self module is not loaded. The user's eyepoint is fixed at the startup configuration position and orientation. The active local user is present in the world. The view and space slave modules are loaded to drive the display. The self module is loaded to allow movement in and manipulation of the virtual world, and to provide a visible avatar.

In the quiescent state, the column filled with the letter "Q" in the table below represents the combination of no space ownership by the host and an inactive user. In such a situation, only the deck module is loaded. The deck module executes no code. It waits in a quiescent state. If it receives a message that the local host has become the owner of a space, the deck starts the Space$_M$ module, which is the server for the owned space.

TABLE I

| Network | Stand-alone | | | | | | Networked | | | | | |
|---|---|---|---|---|---|---|---|---|---|---|---|---|
| Host | No space ownership | | | Space ownership | | | No space ownership | | | Space ownership | | |
| User | Inactive | Passive | Active | Inactive | Passive | Active | Inactive | Passive | Active | Inactive | Passive | Active |
| Deck | ░ | ░ | ░ | ✓ | ✓ | ✓ | ✓ | ✓ | ✓ | ✓ | ✓ | ✓ |
| Space$^M$ | ░ | ░ | ░ | ✓ | ✓ | Q | | | ✓ | ✓ | ✓ | ✓ |
| View | ░ | ░ | ░ | ✓ | ✓ | Q | ✓ | ✓ | | ✓ | ✓ | |
| Space$^s$ | ░ | ░ | ░ | ✓ | ✓ | Q | ✓ | ✓ | | ✓ | ✓ | |
| Self | ░ | ░ | ░ | | ✓ | Q | | ✓ | | | ✓ | ✓ |

Table I illustrates operating modes and associated modules. Check marks indicate modules that are loaded. Gray columns indicate impossible modes. Q in a column indicates the quiescent state.

The startup configuration carries four pieces of data:
1. the network mode, "stand-alone" or "networked"'
2. the host mode, "host owns a space" or "host doesn't own a space";
3. the user mode, "inactive", "passive", or "active"; and
4. the initial user position/orientation, given as a three-dimensional point in world coordinates, and three angles in degrees for yaw, pitch and roll.

The deck module determines the startup configuration for the host. It checks the network mode first. The network mode is "stand-alone" if VR services program started with its network interface disabled, otherwise the mode is "networked". If stand-alone, space ownership is preferably assumed. If networked, the deck queries the space-to-host server to determine the host mode, either "host owns a space" or "host doesn't own a space". It reads the user mode and initial position/orientation from stored data (perhaps a disk file).

On startup, the deck loads modules in accordance with the startup configuration. The stand-alone configuration is used when the connection to the network is non-existent or has been disabled. The stand-alone configuration must run in owned-space host mode, because the master module for the space will not run otherwise and it is impossible to have a slave module run without its master. The stand-alone configuration must run in passive or active user mode, otherwise it is preferably a zero-user space with no network connection through which a user could enter the space.

Table II represents the module used for atypical stand-alone configuration

TABLE II

Local:Deck
    Local:Space$_M$
    Local:Space$_S$
    Local:View

TABLE II-continued

Local:Self$_M$           (if active user mode)
    Local:Vehicle$_M$       (if active user mode)
    Local:Panel$_M$ (if active user mode)
        Local:Root-tool       (if active user mode)
    Local:Avatar$_M$        (if active user mode)
Local:Self$_S$            (if active user mode)
    Local:Vehicle$_S$       (if active user mode)
    Local:Panel$_S$         (if active user mode)
        Local:Root-tool$_S$    (if active user mode)
    Local:Avatar$_S$ (if active user mode)

The networked active-user-at-home configuration is the most common startup type. The system is started with the local user in the local host's owned space.

Table III shows the modules used for a typical active-user-at-home configuration. The list of modules for a typical active-user-at-home is identical to the list for a stand-alone configuration

TABLE III

Local:Deck
    Local:Space$_M$
    Local:Space$_S$
    Local:View
    Local:Self$_M$
        Local:Vehicle$_M$
        Local:Panel$_M$
            Local:Root-tool$_M$
        Local:Avatar$_M$
    Local:Self$_S$
        Local:Vehicle$_S$
        Local:Panel$_S$
            Local:Root-tool$_S$
    Local:Avatar$_S$ The networked active-user-visiting-elsewhere configuration is the second most common startup type. The system is started with the local user in a space owned by another host.

The list of modules used for a typical active-user-visiting-elsewhere configuration differs from the above examples because more than one host is involved. It is assumed that there is only one user in the space being visited, e.g., the local user from this host. The difference is that the slave space module was downloaded from the remote host, and has created visible objects depicting the space owned by that host.

TABLE IV

Local:Deck
    Local:Space$_M$
    Remote:Space$_S$
    Local:View
    Local:Self$_M$
        Local:Vehicle$_M$
        Local:Panel$_M$
            Local:Root-tool$_M$
        Local:Avatar$_M$
    Local:Self$_S$
        Local:Vehicle$_S$
        Local:Panel$_S$
            Local:Root-tool$_S$
    Local:Avatar$_S$ The steps used for starting up a multi-user VR system node are represented here in pseudocode, e.g., Table V. The modules started are limited to those listed in the Module types section of this document. This sequence of steps will start a multi-user VR system 10 node in any of the valid configurations.

TABLE V

```
Deck module loads {
    Read configuration data from storage
        Check if network interface is enabled    (Create the Space_M
module if appropriate.)
        if (networked) {
            Query space-to-host server
            if (host owns a space) {
                Space_M module loads {
                    Tasks started for objects in the space
                }
            }
        }else if (stand-alone) {
            if (user mode is inactive) {
                Abort                            (Invalid
configuration. See Table 1.)
            }
            Space_M module loads {
                Tasks started for objects in the space
            }
        }
                                                 (Create View
and Self if appropriate.)
        if (user mode is passive or active) {
            View module loads {                  (View module
has no master/slave split.)
                Eyepoint camera object is created
                Rendering task is started
            }
            if (user mode is preferably active) {
            }
            Local:Deck => Clone ( Local:DeckID ) => Local:Self_M
        (Create Self_S module)
```

TABLE V-continued

```
                Local:Deck <= Start slave ( URL, Local:Self_M ID ) <=
Local:Self_M
                Self_S module loads {
                    Local:Self_S => slave has started ( Local:Self_S ID )
=> Local:Self_M
                }
                Local:Self_M => Clone ( Local:Self_M ID ) =>
Local:Vehicle_M (Create Vehicle_S)
                Local:SelfM <= Start slave (URL, Local:Vehicle_M ID ) <=
Local:Vehicle_M
                Vehicle_S module loads {
                    Avatar-and-panel-motion task is started
                    Local:VehicleS => slave has started ( Local:Vehicle_S
ID ) => Local:Vehicle_M
                }
                Local:Self_M => Clone ( Local:Self_M ID ) => Local: Panel_M
    (Create Panel_S module)
                Local:Self_M <= Start slave ( URL, Local:Panel_M ID ) <=
Local:Panel_M
                Panel_S module loads {
                    Local:Panel_S => slave has started ( Local:Panel_S ID
) => Local:Panel_M
                    Local:Panel_M =>Clone ( Local:Panel_M ID ) =>
Local :Root-tool_M (Create Root-tool_S)
                    Local:Panel_M <= Start slave ( URL, Local:Root-
tool_M ID ) <= Local:Root-tool_M
                }
        }
        (Create Space_S module)
        if (user's initial position/orientation is in the local host's owned space) {
                Local:Deck => Clone ( Local:Deck ID ) => Local:Space_M
                Local:Deck <= Start slave ( URL, Local:Space_M) <=
Local:Space_M
                Local:Space_S => slave has started ( Local:Space_S ID ) =>
Local:Space_M
                Space_S module loads {
                    Floor visible object is created
                }
        } else if (local user is visiting elsewhere) {
                Local:Deck => Visitation request => Remote:Deck
                Local:Deck <= Visitation ACK/NACK <= Remote:Deck
                if (visitation ACK) {
                    Local:Deck <= Start slave (URL, Remote:Space_M ID ) <=
Remote: Space_M
                    Space_S module starts{
                        Remote Space's visible objects are created
                        Local:Space_S => slave has stareted( Local:Space_S ID
) => Remote:Space_M
                    }
                } else if (visitation NACK) {
                    Abort
                }
        }
}
```

A programming guide for the VR services program (MEME and several example module codes are attached hereto to provide further understanding of the described mechanisms and to aid in their implementation.

Although the present invention has been described in terms of the presently preferred embodiments, it is to be understood that the disclosure is not to be interpreted as limiting. Accordingly, it is intended that the appended claims be interpreted as covering all alterations and modifications as fall within the true spirit and scope of the invention.

What is claimed is:

1. A method of using a platform independent virtual reality environment on a computer system including a plurality of dynamic object modules, wherein the dynamic object modules comprising blocks of executable binary code and wherein each dynamic object module represents a virtual interactive object in the virtual reality environment, the method for allowing a user to add an additional object module while currently running an existing object module, the method comprising the steps of:

a. initializing the virtual reality environment including an existing object module, wherein the additional object module is absent from the virtual reality environment; and b. invoking the additional object module wherein the additional object module's executable binary code communicates with the executable code of the existing object module, such that both the existing object module and the additional object module concurrently run without reinitializing the virtual reality environment.

2. A computer system for providing a virtual reality environment, wherein a first and a second user run application programs on individual host computers and participate directly in the virtual reality environment by viewing and modifying shared objects, and wherein the computer system allows the first user to display a first shared object and add a second shared object from outside of the virtual reality environment and display the second shared object concurrently with the first shared object in the virtual reality environment, the computer system comprising:

a. means for creating a first object module including executable code;

b. means for executing the first object module to display the first shared object in the virtual reality environment, wherein the second shared object is absent from the virtual reality environment; and c. means for concurrently executing a second object module including executable code to display the second object so that the second object module and the first object module are concurrently executing in order to display the second shared object and the first shared object in the virtual reality environment without reinitializing the virtual reality environment.

3. The computer system of claim 2, wherein the executable code are blocks of executable binary code.

4. A computer program for providing a virtual reality environment which allows a first user to display a first object while the first user is creating a second object and for adding the second object so that the second object is capable of being displayed concurrently with the first object, the computer program comprising:

a. means for creating a first object module including platform independent executable code;

b. means for executing the first object module to display the first object, wherein the second object is absent from the virtual reality environment;

c. means for creating a second object module including platform independent executable code; and d. means for concurrently executing the second object module so that the second object module and the first object module are concurrently executing without reinitializing the virtual reality environment, thereby allowing both the first and the second object to be simultaneously displayed.

5. The computer program as claimed in claim 4, wherein the first object module and the second object module contain unique indenter for uniquely identifying the first and the second object module and a host computer to which the first and the second object module belong.

6. The computer program as claimed in claim 4, configured to allow the first user to participate in the virtual reality environment via a network.

7. The computer program as claimed in claim 4, further comprising means to execute a compound object module wherein the compound object module links a plurality of displayed virtual objects.

8. The computer program as claimed in claim 4, wherein the means for creating the first object module further comprises a text editor.

9. The computer program as claimed in claim 4, wherein the means for concurrently executing the second object module, further comprises selecting from a programmable menu selection.

10. The computer program as claimed in claim 4, wherein the first object module interacts with the second object module while the first object module and the second object module are executing simultaneously.

11. The computer program of claim 4, wherein the executable code are blocks of executable binary code.

12. The computer program of claim 4, comprising a platform independent execution engine for executing the platform independent executable code corresponding to the first object module and the second object module.

13. The computer program as claimed in claim 4, configured to allow a second user to participate in the virtual reality environment wherein the second user acquires copies of the first and second object modules over a network.

14. The computer program as claimed in claim 13, comprising a master copy of the first and the second object module wherein the master copies reside with the first user and are used to provide copies of the first and the second object modules.

15. The computer program as claimed in claim 14, wherein the master copies are a means for controlling the slave copy such that the second user cannot modify the corresponding virtual object.

16. The computer program as claimed in claim 14, further comprising:

a. means for the second user to request an authorization from the master copy to change to one of the corresponding slave copies; and b. means for changing the one of the corresponding slave copies according to changes made pursuant to the authorization.

17. The computer program as claimed in claim 13, wherein the second user accesses the virtual reality environment via a network.

18. The computer program as claimed in claim 14, further comprising means for protecting the master copy against an unauthorized change by the slave copy wherein the master copy blocks the slave copy from making the unauthorized change to the slave copy.

19. The computer program as claimed in claim 14, further comprising means for creating slave copies from the first and second master copies, wherein the, the slave copies are executable to display the first and second virtual objects in the virtual environment.

20. A computer program for providing a virtual reality environment for a first user and a second user wherein the first and second users are connected via a network, the computer program comprising:

a. means for executing an object module to display a first object such that the first user can independently create the virtual reality environment wherein the first object is created solely by the first user; and b. means for transferring the first user object module directly to the second user via the network as a slave copy so that the second user can display the first object without interrupting the first user and wherein the second user can also participate directly in the virtual reality environment.

21. The computer program of claim 20, wherein the object module comprises an executable block of binary code.

22. The computer program of claim 20, comprising a platform independent execution engine.

23. A platform independent software program for creating a virtual reality environment comprising a plurality of object modules each comprising a block of executable binary code for providing a sequence of computer instructions for displaying a graphical virtual environment with corresponding virtual objects, wherein the virtual objects are capable of being modified while displaying the graphical virtual environment.

24. A multi-user networked system including a plurality of networked host computers each configured for allowing a plurality of virtual object modules, each comprising executable binary code, to execute concurrently in a shared virtual reality environment and wherein at least two of the networked host computers operate under different operating platforms, further wherein users are capable of adding and deleting additional virtual object in the virtual reality environment in real time without reinitializing the shared virtual reality environment.

25. A system for a plurality of networked users to view and modify a displayable three-dimensional virtual object in virtual reality environment, wherein the three-dimensional virtual object is represented by a dynamic object module including executable binary code representing the displayable three dimensional virtual object, the system comprising;
   a. means for receiving object modification requests from the plurality of networked users;
   b. means for arbitrating the modification requests resulting in a modified executable binary code;
   c. means for executing the modified executable binary code resulting in a corresponding modified three-dimensional virtual object; and
   d. means for editing the displayable three dimensional virtual object according to the modified executable binary code.

26. A computer architecture for creating a virtual reality environment, the architecture comprising:
   a. a means for selecting object module codes comprising block of binary code which provides executable instructions to display virtual objects;
   b. a memory for storing object module codes;
   c. an application program for simulating a virtual reality environment;
   d. a platform independent execution engine for bringing selected object module codes in and out of the applications program while the application program is running to display corresponding virtual objects within the virtual reality environment.

27. The computer architecture of claim 26, wherein object module codes persist within the application program until they are intentionally deleted.

* * * * *

UNITED STATES PATENT AND TRADEMARK OFFICE
CERTIFICATE OF CORRECTION

PATENT NO.      : 6,421,047 B1
DATED           : July 16, 2002
INVENTOR(S)     : De Groot It is certified that error appears in the above-identified patent and that said Letters Patent is hereby corrected as shown below:

Column 2,
Line 19, delete "Fach" and replace with -- Each --.

Column 12,
Line 20, add the phrase -- without first receiving authorization from the master copies -- after the phrase "corresponding virtual object".

Signed and Sealed this

Fifth Day of November, 2002

*Attest:*

*Attesting Officer*

JAMES E. ROGAN
*Director of the United States Patent and Trademark Office*